US006997970B2

(12) United States Patent
Crome

(10) Patent No.: US 6,997,970 B2
(45) Date of Patent: Feb. 14, 2006

(54) OXYGEN/INERT GAS GENERATOR

(75) Inventor: Victor P. Crome, Davenport, IA (US)

(73) Assignee: Carleton Life Support Systems, Inc., Davenport, IA (US)

(*) Notice: Subject to any disclaimer, the term of this patent is extended or adjusted under 35 U.S.C. 154(b) by 0 days.

(21) Appl. No.: 10/464,498

(22) Filed: Jun. 19, 2003

(65) Prior Publication Data
US 2003/0233936 A1 Dec. 25, 2003

Related U.S. Application Data

(60) Provisional application No. 60/391,086, filed on Jun. 25, 2002.

(51) Int. Cl.
B01D 53/04 (2006.01)

(52) U.S. Cl. .............. 95/8; 95/96; 95/130; 95/138; 96/111; 96/130; 96/134; 96/143

(58) Field of Classification Search .............. 95/8, 95/11, 12, 96, 106, 130, 138; 96/111, 115, 96/130, 134, 142, 143
See application file for complete search history.

(56) References Cited

U.S. PATENT DOCUMENTS

| 3,922,149 | A | * | 11/1975 | Ruder et al. ............ 95/22 |
| 4,109,509 | A | | 8/1978 | Cramer et al. |
| 4,197,096 | A | * | 4/1980 | Sebastian et al. ........ 96/110 |
| 4,378,920 | A | | 4/1983 | Runnels et al. |
| 4,681,602 | A | | 7/1987 | Glenn et al. |
| 4,732,579 | A | * | 3/1988 | Veltman et al. ........... 95/96 |
| 4,863,492 | A | * | 9/1989 | Doshi et al. ............. 95/8 |
| 4,870,960 | A | | 10/1989 | Hradek et al. |
| 5,071,453 | A | | 12/1991 | Hradek et al. |
| 5,163,978 | A | * | 11/1992 | Leavitt et al. ........... 95/8 |
| 5,226,931 | A | * | 7/1993 | Combier .................. 95/45 |
| RE34,434 | E | * | 11/1993 | Campbell et al. ........ 96/110 |
| 5,298,054 | A | * | 3/1994 | Malik .................... 95/99 |
| 5,486,226 | A | * | 1/1996 | Ross et al. .............. 95/11 |
| 5,766,310 | A | | 6/1998 | Cramer |
| 5,858,063 | A | | 1/1999 | Cao et al. |
| 5,904,190 | A | | 5/1999 | Patel |
| 6,063,169 | A | | 5/2000 | Cramer et al. |
| 6,319,305 | B1 | | 11/2001 | Phillips et al. |
| 6,343,465 | B1 | | 2/2002 | Martinov |
| 6,394,089 | B1 | * | 5/2002 | Cantrill et al. ........ 128/205.12 |

(Continued)

FOREIGN PATENT DOCUMENTS

JP 01 095 996 A 6/2001

Primary Examiner—Robert H. Spitzer
(74) Attorney, Agent, or Firm—Jaeckle Fleischmann & Mugel, LLP

(57) ABSTRACT

A gas generation method and apparatus, capable of use in an aircraft, generates oxygen with at least one On Board Oxygen Generating System (OBOGS) and generates an inert gas with at least one On Board Inert Gas Generating System (OBIGGS) and selectively supplies an auxiliary supply of inert gas utilizing a waste gas output of the at least one OBOGS. The inert gas can include nitrogen. An auxiliary source of oxygen can also be provided. Control valves can be used to selectively supply the waste gas output of the at least one OBOGS to the atmosphere or to either of two locations. The oxygen can be used in a passenger compartment of the aircraft and the inert gas used in either a fuel tank or cargo bay of the aircraft.

41 Claims, 1 Drawing Sheet

U.S. PATENT DOCUMENTS

| | | |
|---|---|---|
| 6,402,812 B1 * | 6/2002 | Perrotta et al. ................ 95/95 |
| 6,547,188 B1 | 4/2003 | Schmutz et al. |
| 6,585,192 B1 * | 7/2003 | Beers ..................... 244/135 R |
| 6,604,558 B1 | 8/2003 | Saucer |
| 6,634,598 B1 | 10/2003 | Susko |
| 6,712,876 B1 * | 3/2004 | Cao et al. ..................... 95/10 |
| 2002/0070035 A1 | 6/2002 | Grabow et al. |

* cited by examiner

OXYGEN/INERT GAS GENERATOR

CROSS-REFERENCE TO RELATED APPLICATIONS AND CLAIM OF PRIORITY

This application claims the benefit of U.S. Provisional Application No. 60/391,086, filed Jun. 25, 2002.

BACKGROUND OF THE INVENTION

1. Field of the Invention

The present invention relates to an oxygen/inert gas generator capable of use in aircraft and more particularly, the present invention relates to a hybrid On Board Oxygen Generating System (OBOGS) and an On Board Inert Gas Generating System (OBIGGS).

2. Description of the Related Art

The present invention addresses the need aboard many aircraft for oxygen-enriched and nitrogen enriched gases. Oxygen is needed for passengers in the event of decompression of the aircraft passenger compartment to pressures equivalent to altitudes greater than 10,000 feet. Some passengers with lung disorders may also require oxygen. Nitrogen is needed to inert the space above the fuel in the fuel tanks, also called the ullage, to reduce the possibility of explosive conditions. Nitrogen can also be used to help extinguish fires in the cargo bays.

Two technologies have been commonly used to provide oxygen-enriched and nitrogen-enriched gas aboard aircraft from pressurized air that is available from the engine bleed air sources. An On Board Oxygen Generating System (OBOGS) and an On Board Inert Gas Generating System (OBIGGS) employing molecular sieves and a pressure swing adsorption process (PSA) have been widely used as one technology to respectively provide oxygen-enriched and nitrogen-enriched gases. A second technology used to provide nitrogen-enriched gas is commonly referred to as Hollow Fiber Membrane (HFM) or permeable Membrane (PM) technology.

The approach using molecular sieves and the PSA process is generally accepted as the best way to generate oxygen-enriched gas aboard aircraft when the purity requirements are less than about 95% oxygen. The PSA and HFM technologies used to produce nitrogen-enriched gas each have particular advantages and disadvantages depending upon the available aircraft resources, gas flow rates and purity of nitrogen-enriched gas desired, and the environmental conditions such as temperature, air supply pressure and surrounding absolute pressure, or altitude. Each parameter affects the performance of each technology differently. For instance, PSA-based technology generally performs better at temperatures of about 70 degrees Fahrenheit, while the HFM technology performs better at temperatures of about 160 degrees Fahrenheit. There are many parameters that must be considered to best utilize these technologies most effectively for each application.

Many attempts have been made to find synergy in applying the gas separation technologies aboard aircraft to generate oxygen-enriched and nitrogen-enriched gases that use less engine bleed air and electrical power and/or reduce the size and weight of the gas separation systems. One of the successful attempts is the combination OBOGS/OBIGGS used on the V-22 aircraft. This system uses two types of molecular sieves and the same PSA process to generate oxygen-enriched gas for aircrew breathing and nitrogen-enriched gas to inert the fuel tank ullage. This two-gas system provides synergistic benefits in reduced size and weight by sharing common system components such as the inlet filter, pressure reducer, PSA cycling valve, and control electronics to produce both gases.

The oxygen concentrating PSA technology and the nitrogen concentrating HFM technology each have limits to the purity of the gases produced and the concentration of the waste gases that are enriched with other primary constituents in air that is not desired as the enriched product gas. For example, the PSA-based OBOGS separates oxygen-enriched gas for breathing, but also must exhaust nitrogen-enriched gas that is commonly discarded to the surrounding atmosphere. Likewise, the HFM-based OBIGGS separates nitrogen-enriched gas for inerting purposes, but also must exhaust oxygen-enriched waste gas that is commonly discarded to the surrounding atmosphere.

Many have thought that it would be desirable to use the nitrogen-enriched exhaust gas from the OBOGS as inlet gas to the HFM OBIGGS to enhance its performance, or the oxygen-enriched exhaust gas from the OBIGGS as inlet gas to the PSA OBOGS to enhance its performance. However, the PSA and HFM technologies each require pressure differentials from their inlets to their exhaust ports for best performance. Generally, the PSA-based OBOGS and OBIGGS processes work well with 20 to 60 psig of inlet air pressure with the exhaust free to vent to the surrounding atmosphere. The HFM OBIGOS technology works well with inlet air pressure of about 25 psig to about 100 psig, with the higher pressures preferred.

The inlet air pressure available on board aircraft typically ranges from about 20 psig to 75 psig, with most aircraft air supplies in the lower half of that range. Therefore, a typical aircraft air supply of 30 psig works fairly well as a supply for each OBOGS and OBIGGS technology, but coupling the exhaust from the OBOGS to the inlet of the OBIGGS would degrade the OBOGS performance. This would limit the free exhausting of the waste gas during the PSA process, while also reducing the inlet pressure to the HFM OBIGGS. Each may have only about 15 psig of energy available to drive each process. This is well below the preferred pressures desired for each process for near-optimum performance.

A compressor could be added between the OBOGS exhaust and the OBIGGS inlet to increase the effective pressure differentials available for each gas-separation process. U.S. Pat. No. 4,681,602 discloses such an integrated system for generating inert gas and breathing gas on an aircraft that utilizes a compressor to compress an output from one gas generator prior to inputting it to the other gas generator. However, the compressor's size, weight and cost penalties more than offset the gas-separation performance gains.

U.S. Pat. No. 6,319,305 discloses a gas generating system for generating a supply of oxygen and a residual gas including a first gas separation device for separating oxygen-enriched gas from a supply gas and leaving a residual gas. The first oxygen-enriched gas from the first gas separation device is inputted to a second gas separation device for further separating oxygen gas from the first oxygen-enriched gas. The second gas separation device generates a product gas that is at least highly oxygen-enriched and a further residual gas, with at least one of the first and second gas separating devices including a ceramic membrane through which gas ions diffuse.

SUMMARY OF THE INVENTION

It is an object of the present invention to provide an oxygen/inert gas generator capable of use in aircraft and more particularly, it is an object of the present invention to provide a hybrid On Board Oxygen Generating System (OBOGS) and an On Board Inert Gas Generating System (OBIGGS).

In accordance with one aspect of the present invention, one or more OBOGSs are provided to generate oxygen and one or more OBIGGSs are provided to generate an inert gas with the waste gas output of the one or more OBOGSs being utilized as an auxiliary source of inert gas.

These and other objects of the present invention may be achieved by providing a gas generator system including: at least one On Board Oxygen Generating System (OBOGS) to generate oxygen; and at least one On Board Inert Gas Generating System (OBIGGS) to generate an inert gas; wherein a waste gas output of the at least one OBOGS is used to selectively supply an auxiliary supply of inert gas.

These and other objects of the present invention may also be achieved by providing a method of generating gases, the method including: generating oxygen with at least one On Board Oxygen Generating System (OBOGS); generating an inert gas with at least one On Board Inert Gas Generating System (OBIGGS); and selectively supplying an auxiliary supply of inert gas utilizing a waste gas output of the at least one OBOGS.

In the above-noted system and method, the at least one OBOGS can include two OBOGSs and the at least one OBIGGS can include two OBIGGSs.

Furthermore, in the above-noted system and method, the inert gas can include nitrogen and an auxiliary source of oxygen can also be provided.

In the above-noted system and method, a first control valve and a second control valve can be provided, the first control valve selectively supplying the waste gas output of the at least one OBOGS to the second control valve and the second control valve selectively supplying the waste gas output of the at least one OBOGS to either of two locations.

In the above-noted system and method, at least one heat exchanger can be provided to receive the air at a first temperature and to provide air and a second temperature to both the OBOGS and OBIGGS.

In the above-noted system and method, at least one filter/water separator can be provided to receive the air and to provide filter air with a reduced water content to both the OBOGS and OBIGGS.

In the above-noted system and method, the auxiliary source of oxygen can include at least one tank of compressed oxygen.

These and other objects of the present invention may also be achieved by providing a gas generator system for an aircraft including a passenger compartment, a fuel tank, and a cargo bay, the system including: at least one On Board Oxygen Generating System (OBOGS) arranged to generate oxygen and to supply said oxygen to the passenger compartment; and at least one On Board Inert Gas Generating System (OBIGGS) arranged to generate an inert gas and to selectively supply said inert gas to the fuel tank or the cargo bay; wherein a waste gas output of said at least one OBOGS is used to selectively supply an auxiliary supply of inert gas to either of the fuel tank or the cargo bay.

These and other objects of the present invention may also be achieved by providing a method of generating gases for use in an aircraft including a passenger compartment, a fuel tank, and a cargo bay, the method including: generating oxygen with at least one On Board Oxygen Generating System (OBOGS) and supplying the oxygen to the passenger compartment of the aircraft; generating an inert gas with at least one On Board Inert Gas Generating System (OBIGGS) and selectively supplying the inert gas to one of either the fuel tank or the cargo bay of the aircraft; and selectively supplying an auxiliary supply of inert gas to one of either the fuel tank or the cargo bay utilizing a waste gas output of the at least one OBOGS.

In the above-noted system and method, the at least one OBOGS can include two OBOGSs and the at least one OBIGGS can include two OBIGGSs.

Furthermore, in the above-noted system and method, the inert gas can include nitrogen and an auxiliary source of oxygen can also be provided.

In the above-noted system and method, a first control valve and a second control valve can be provided, the first control valve selectively supplying the waste gas output of the at least one OBOGS to the second control valve and the second control valve selectively supplying the waste gas output of the at least one OBOGS to either the fuel tank or the cargo bay.

In the above-noted system and method, at least one heat exchanger can be provided to receive the air at a first temperature and to provide air and a second temperature to both the OBOGS and OBIGGS.

In the above-noted system and method, at least one filter/water separator can be provided to receive the air and to provide filter air with a reduced water content to both the OBOGS and OBIGGS.

In the above-noted system and method, the auxiliary source of oxygen can include at least one tank of compressed oxygen.

BRIEF DESCRIPTION OF THE DRAWINGS

The foregoing and a better understanding of the present invention will become apparent from the following detailed description of an example embodiment and the claims when read in connection with the accompanying drawings, all forming a part of the disclosure of this invention. While the foregoing and following written and illustrated disclosure focuses on disclosing an example embodiment of the invention, it should be clearly understood that the same is by way of illustration and example only and that the invention is not limited thereto. This spirit and scope of the present invention are limited only by the terms of the appended claims.

DETAILED DESCRIPTION

Figure 1:
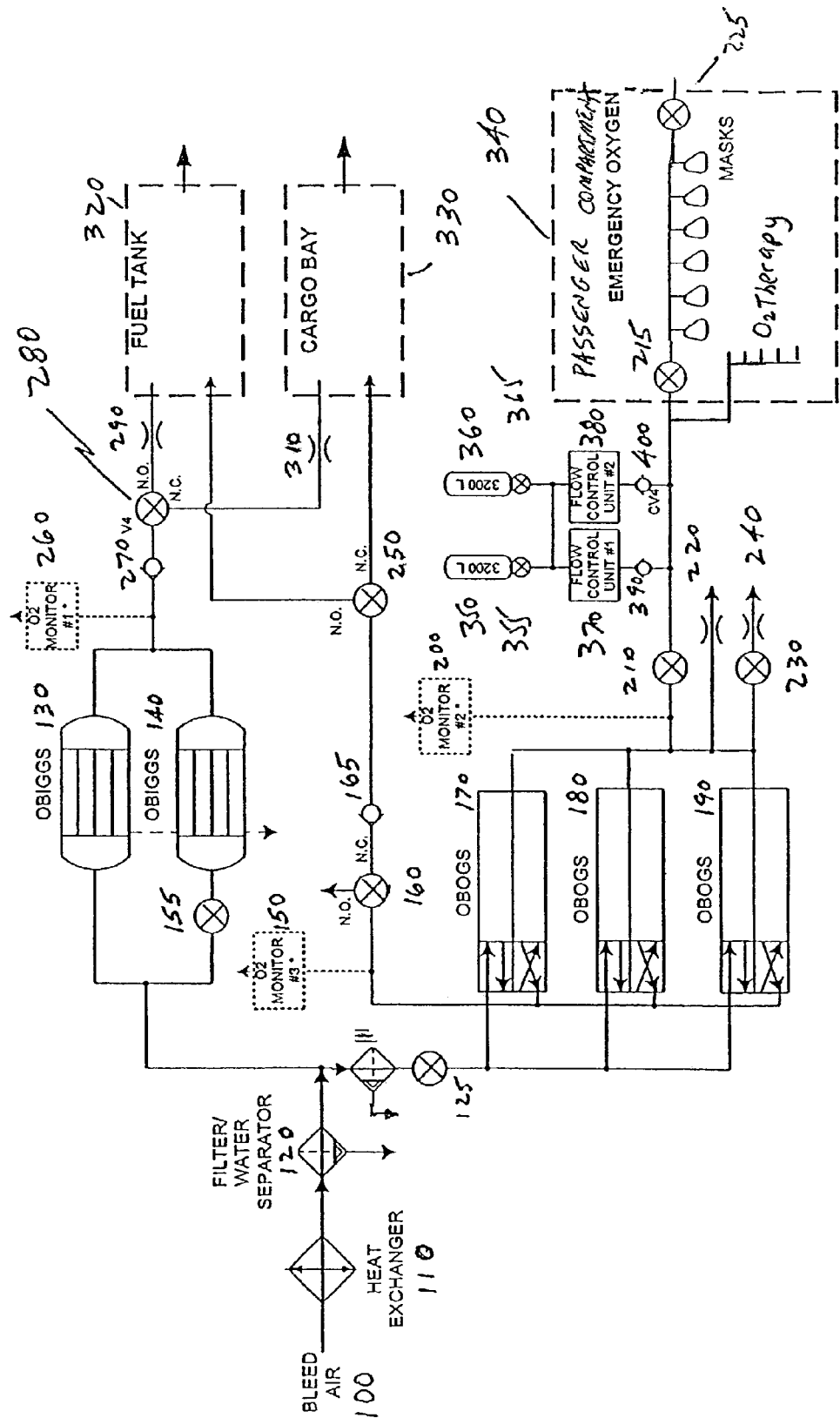
FIG. 1 is a block diagram illustrating an oxygen/inert gas generator in accordance with an example embodiment of the present invention.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/value/ranges may be given, although the present invention is not limited thereto. When specific details are set forth in order to describe an example embodiment of the present invention, it should be apparent to one skilled in the art that the invention can be practiced without, or with variations of, these specific details. Lastly, it should be apparent that differing combinations of hardwired control circuitry and software instructions may be used to implement embodiments of the present invention, that is, the present invention is not limited to any specific combination of hardware and software.

A new way that synergy might be realized is if the exhaust gas from one type of separator could be used to satisfy one of the other gas needs without re-compressing it. It is commonly understood that the oxygen outlet product purity of PSA-based OBOGS oxygen concentrators is reduced as product flow is increased. Laboratory tests indicate that the oxygen purity in the exhaust gas also is reduced as the oxygen product flow is increased. Traditional PSA-based OBOGS oxygen concentrators can generate product purity levels of about 50% to 95% oxygen for breathing, and exhaust gas purity levels of about 13% to 20% oxygen, respectively. Laboratory testing of PSA-based OBOGS concentrators has also revealed that increasing oxygen product flow beyond what is commonly considered the lower end of useful oxygen purity of about 50% results in the oxygen purity of the exhaust being reduced to about 11%. The HIFM OBIGGS separation process can generate product purity levels of 1 to 12% oxygen that are useful for inerting fuel tanks or cargo bays, while the exhaust can be about 30% to 40% oxygen.

The HFM exhaust gas oxygen levels may be near useful oxygen levels that could be supplied to aircraft passenger masks after a cabin-decompression and the aircraft has descended to an altitude slightly above 10,000 feet. However, the exhaust gas from the HFM separator may contain carbon monoxide, carbon dioxide, and water because these substances also permeate through the fiber with the oxygen. The source air must be breathable before it passes through the HFM to the exhaust, if it is intended to be a breathable gas. The PSA based oxygen concentrators remove these impurities from the oxygen product stream and exhaust them overboard.

It is generally accepted within the aerospace industry that the fuel tank ullage should be below about 10% oxygen to prevent a potentially explosive fuel-air mixture, and that the cargo bays should be below about 12% oxygen after a fire has been suppressed to keep it from re-igniting. This would suggest that the exhaust from a PSA OBOGS in the range 11 to 13% oxygen, by itself, may be too oxygen rich to reach the final requirement for inerting cargo bays or fuel tanks in a reasonable period of time. Nevertheless, even the exhaust with 13% oxygen can be effectively used to accelerate the inerting of the fuel tank or cargo bay from 20.8% to a lower value, because it is a high volumetric flow rate and a high percentage of the inlet air stream, thereby reducing air consumption. The exhaust gas from a properly tuned PSA oxygen concentrator is more effective during the early portion of the time allowed to initially inert the fuel tank than an HIM on a system weight basis by a factor of roughly 2:1.

The amount of inert gas flow required to keep the tank inert after the initial 30 minutes during the aircraft ascent and cruise flight segments is usually less than 50% of that required to initially inert the tank. Therefore, the OBOGS can be used to provide emergency oxygen for the passengers, while reducing the weight of the OBIGGS by about 20%.

Even though the exhaust from the OBOGS has too much oxygen to complete the inerting task, a computer analysis indicates that it can be effectively used during the first portion of the tank inerting period. In combination with a HFM OBIGGS, OBOGS exhaust can accelerate the inerting of the tank without adding the additional OBIGGS weight that would be required instead of using the OBOGS exhaust.

FIG. 1 is a block diagram of a gas separation system that can be used to provide inerting gas for fuel tanks and cargo bays as well as emergency oxygen for aircraft passengers and oxygen for passengers who require it for therapy. The OBOGS exhaust is also used to aid in the inerting requirements mentioned above. For example, OBOGS exhaust can be used as a gas for inerting fuels tanks and for cargo bays after a fire is "knocked down".

In the present invention it is assumed that none of the OBOGS and OBIGGS product gas needs are simultaneous with any of the other needs. For example, fuel tank inerting is needed on every flight, but cargo bay inerting would supersede the need for fuel tank inerting after a cargo bay fire is knocked down. Oxygen for therapy for a limited number of passengers may be needed on many flights, but emergency oxygen for all passengers would supersede and still would provide oxygen therapy for those passengers that required it initially.

The OBIGGS and OBOGS units could share a common source of pressurized air after passing through appropriate temperature, particulate and moisture conditioning devices such as one or more heat exchangers, filters, and water separators. Each OBIGGS and OBOGS unit could be provided with a remotely controlled shut off valve to allow only the units required for specific scenarios to be activated. For example, OBIGGS product flows are generally higher to initially inert the fuel tanks and lower during aircraft ascent and cruise modes. OBOGS oxygen flow can be rather low for a few passengers requiring oxygen for therapy, but would be high after loss of cabin pressure at aircraft altitudes greater than 10,000 feet.

Cylinders containing stored oxygen can be used to provide passenger emergency oxygen immediately after a cabin decompression. This would provide the necessary period of time to provide air to the OBOGS units and to start the oxygen concentrating process. The OBOGS units could provide emergency oxygen for any extended period of time required.

An oxygen monitor could be used to monitor the purity of each oxygen-enriched or nitrogen-enriched gas that is used to satisfy a need. In this case, three distinct sources of useable product gases are anticipated, and a separate monitor can be used for each or a single monitor with product sample valves can be used to monitor each gas as required.

Referring to FIG. 1, bleed air 100 is passed through a heat exchanger 110 so as to reduce the air temperature to a value suitable for the OBIGGS, and through another heat exchanger 111 so as to further reduce the air temperature to a value suitable for the OBOGS. After passing through the heat exchanger 110, air is then passed through a filter/water separator 120 to eliminate water and various impurities, such as particulates.

The filtered moisture free air from the filter/water separator 120 is then inputted to OBIGGS units 130 and 140 and to OBOGS units 170, 180, and 190. While two OBIGGS units 130 and 140 and three OBOGS units 170, 180, and 190 have been shown, it is of course understood that the present invention is not limited to the specific number of units shown. Furthermore, shut off valves 155 and 125 can be optionally provided to respectively shut off OBIGGS or OBOGS units that are not needed.

The inert gas (nitrogen gas) outputs of the OBIGGS units 130 and 140 are combined and passed through a check valve 270 and control valve 280 and control orifices 290 and 310. The inert gas outputted from the control orifices 290 and 310 are respectively inputted to the fuel tank 320 and the cargo bay 330 so as to reduce the possibility of explosive conditions in the fuel tank 320 and to help extinguish fires in the cargo bay 330.

The oxygen gas outputs of the OBOGS units 170, 180, and 190 are combined and inputted to control valves 210 and 230. The output of control valve 210 is inputted to emergency oxygen masks 340. The output of control valve 230 is passed through control orifice 240, which can be of a fixed or variable size.

In addition, the waste gas output of OBOGS units 170, 180, and 190, consisting mainly of nitrogen gas, is passed through control valve 160, check valve 165, and inputted to control valve 250 which selectively outputs the waste gas from the OBOGS units 170, 180, and 190 to the fuel tank 320 or to the cargo bay 330.

Oxygen tanks 350 and 360 have their outputs passing through respective regulators 355 and 365 and respective flow control units 370 and 380 and respective check valves 390 and 400 whose outputs also feed the emergency oxygen masks 340.

Oxygen monitors 150, 260, and 200 are provided to respectively measure the oxygen content outputted from the waste gas of OBOGS units 170, 180, and 190, the nitrogen enriched inert gas outputs of the OBIGGS units 130 and 140 and the oxygen enriched gas outputs of the OBOGS units 170, 180, and 190. It is of course understood that a single oxygen monitor and appropriate control valve can be substituted for the three oxygen monitors 150, 260, and 200.

The system illustrated in FIG. 1 operates in four basic operational modes, namely, a first, fuel tank inerting mode, a second, emergency oxygen to passengers mode, a third, cargo bay inerting mode, and a fourth, oxygen therapy mode.

Using the OBIGGS units for fuel tank inerting is the most common mode of operation and will be used all of the time unless an emergency condition exists. If cargo bay inerting is required, the inerting gas will be routed to the cargoqbay 330. In the fuel tank inerting mode, inlet air is routed to the OBIGGS units 130 and 140 that will immediately start providing inerting gas to the fuel tank 320 upon the application of inlet air pressure. The inerting gas flows through the check valve 270, the normally open product selector valve 280, the flow control orifice 290, and then into the fuel tank 320. Initial inerting can be supplemented by the use of the OBOGS units waste gas. Opening the shut off valve 125 starts the OBOGS units 170, 180, and 190. The valve 230 is also open to provide a known outlet flow from the OBOGS units 170, 180, and 190 so as to generate approximately 12% oxygen produced at the OBOGS units 170, 180, and 190 waste gas output. The valve 160 is energized so as to route the waste gas from the OBOGS units 170, 180, and 190 through the selector valve 250 and into the fuel tank 320 so as to supplement the output of the OBIGGS units 130 and 140.

In the emergency oxygen to passengers mode, upon cabin decompression, the flow control units 370 and 380 are activated to provide oxygen from the cylinders 350 and 360 during the startup of the OBOGS units 170, 180, and 190. Initially, valve 210 is closed until the proper oxygen concentration is reached, and then is opened to provide oxygen to the passengers. In the oxygen therapy mode, which can be optional, the output gas of one or more of the OBOGS units 170, 180, and 190 is used to provide oxygen enriched gas for passengers needing oxygen therapy. Valves 125 and 210 are opened to provide inlet air to the OBOGS and the product gas from the OBOGS. This optional mode requires the addition of valve 215 to prevent oxygen from flowing into all of the passengers' masks. Purge valve 225 is used to allow venting of any residual gases during the initial stages of the emergency oxygen to passengers mode. Control orifice 220 provides a known outlet flow during startup conditions. Valve 230 is closed and valve 160 is placed in the normally open position so as to simply vent waste gas.

In the cargo bay inerting mode, the output gas of the OBIGGS units 130 and 140 and the waste gas output of the OBOGS units 170, 180, and 190 can be routed to the cargo bay 330. Valve 280 will be energized to route the output gas of the OBIGGS units 130 and 140 to the cargo bay 330 and valve 250 will also be energized to also route the waste gas output of the OBOGS units 170, 180, and 190 to the cargo bay 330.

The specific details of the OBIGGS units 130 and 140 and the OBOGS units 170, 180, and 190 have been omitted for the sake of brevity. The specific details thereof are disclosed in U.S. Pat. Nos. 4,870,960, 5,071,453, 5,766,310, 5,858,063, 6,063,169, and 6,394,089, and the contents of these patents are incorporated by reference herein in their entirety.

This concludes the description of the example embodiment. Although the present invention has been described with reference to an illustrative embodiment thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangements within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A method of generating gases, the method comprising:
   generating oxygen from a first air stream input with at least one On Board Oxygen Generating System (OBOGS);
   generating an inert gas from a second air stream input with at least one On Board Inert Gas Generating System (OBIGGS), said first air stream input and said second air stream input having substantially the same ratio of nitrogen to oxygen; and
   selectively supplying one of a fuel tank or cargo bay with a waste gas output of the at least one OBOGS.

2. The method of claim 1, wherein the at least OBOGS comprises two OBOGSs.

3. The method of claim 1, wherein at least one OBIGGS comprises two OBIGGSs.

4. The method of claim 1, wherein the inert gas comprises nitrogen.

5. The method of claim 1, further comprising providing an auxiliary source of oxygen.

6. The method of claim 5, wherein the auxiliary source of oxygen provides oxygen from at least one tank of compressed oxygen.

7. The method of claim 1, further comprising selectively supplying the waste gas output of said at least one OBOGS to either the atmosphere or to either of two locations.

8. The method of claim 1, further comprising receiving a third air stream at a first temperature and providing said third air stream at a modified temperature as a source for said first and second air streams.

9. The method of claim 1, further comprising receiving a third air stream and providing filtered air with a reduced water content as a source for said first and second air streams.

10. The method of claim 1, further comprising monitoring oxygen content of at least one of the gases.

11. A method of generating gases for use in an aircraft including a passenger compartment, a fuel tank, and a cargo bay, the method comprising:
   generating oxygen from a first air inlet with at least one On Board Oxygen Generating System (OBOGS) and supplying the oxygen to the passenger compartment of the aircraft;
   generating an inert gas from a second air inlet with at least one On Board Inert Gas Generating System (OBIGGS) and selectively supplying the inert gas to either the fuel tank or the cargo bay of the aircraft), said first air stream inlet and said second air stream inlet receiving substantially the same ratio of nitrogen to oxygen; and
   selectively supplying a waste gas output of the at least one OBOGS to one of the either the fuel tank or the cargo bay.

12. The method of claim 11, wherein the at least one OBOGS comprises two OBOGSs.

13. The method of claim 11, where the at least one OBIGGS comprises two OBIGGSs.

14. The method of claim 11, wherein the inert gas comprises nitrogen.

15. The method of claim 11, further comprising selectively providing an auxiliary source of oxygen to the passenger compartment.

16. The method of claim 15, within the auxiliary source of oxygen provides oxygen from at least one tank of compressed oxygen.

17. The method of claim 11, further comprising selectively supplying the waste gas output of the at least one OBOGS to either the atmosphere or to either the fuel tank or the cargo bay.

18. The method of claim 11, further comprising receiving a third air stream at a first temperature and providing said third air stream at a modified temperature as a source for said first and second air inlets.

19. The method of claim 11, further comprising receiving a third air stream and providing filtered air with a reduced water content as a source for said first and second air inlets.

20. The method of claim 11, further comprising monitoring the oxygen content of at least one of the gases.

21. A gas generator system comprising:
   at least one On Board Oxygen Generating System (OBOGS) arranged to receive a first air stream and generate oxygen therefrom, the OBOGS having an outlet in fluid communication with one of a fuel tank or cargo bay; and
   at least one On Board Inert Gas Generating System (OBIGGS) arranged to receive a second air stream and generate an inert gas therefrom, said first air stream and said second air stream having substantially the same ratio of nitrogen to oxygen;
   wherein a waste gas output of said at least one OBOGS is selectively supplied to the fuel tank or cargo bay.

22. The systems of claim 21, wherein said at least one OBOGS comprises two OBOGSs.

23. The system of claim 21, wherein said at least one OBIGGS comprises two OBIGGSs.

24. The system of claim 21, wherein said inert gas comprises nitrogen.

25. The system of claim 21, further comprising an auxiliary source of oxygen.

26. The system of claim 25, wherein said auxiliary source of oxygen comprises at least one tank of compressed oxygen.

27. The system of claim 21, further comprising a first control valve and a second control valve, said first control valve selectively supplying the waste gas output of said at least one OBOGS to either the atmosphere or to said second control valve and said second control valve selectively supplying the waste gas output of said at least one OBOGS to either of two locations.

28. The system of claim 21, further comprising at least one heat exchanger to receive a third air stream at a first temperature to provide said third air stream at a modified temperature as a source for said first and second air streams.

29. The system of claim 21, further comprising at least one filter/water separator to receive a third air stream and to provide filtered air with a reduced water content as a source for said first and second air streams.

30. They system of claim 21, further comprising at least one oxygen monitor.

31. The system of claim 21 wherein the OBIGGS is in fluid communication with one of the fuel tank or cargo bay.

32. A gas generator system for an aircraft including a passenger compartment, a fuel tank, and a cargo bay, the system comprising:
   at least one On Board Oxygen Generating System (OBOGS) arranged to receive a first air stream input and generate oxygen therefrom and to supply said oxygen to the passenger compartment the OBOGS having an outlet in fluid communication with one of the fuel tank or cargo bay; and
   at least one On Board Inert Gas Generating System (OBIGGS) arranged to receive a second air stream and generate an inert gas therefrom and to selectively supply said inert gas to the fuel tank or cargo bay, said first air stream derived from said second air stream after said second air stream is conditioned by one or more processes consisting of processes which do not substantially alter the nitrogen to oxygen ratio of said second air stream;
   wherein a waste gas output of said at least one OBOGS is selectively output to either of the fuel tank or the cargo bay.

33. The system of claim 32, wherein said at least one OBOGS comprises two OBOGSs.

34. The system of claim 32, wherein said at least one OBIGOS comprises two OBIGGSs.

35. The system of claim 32, wherein said inert gas comprises nitrogen.

36. The system of claim 32, further comprising an auxiliary source of oxygen to selectively supply oxygen to the passenger compartment.

37. They system of claim 36, wherein said auxiliary source of oxygen comprises at least one tank of compressed oxygen.

38. The system of claim 32, further comprising a first control valve and a second control valve, said first control valve selectively supplying the waste gas output of said at least one OBOGS to either the atmosphere or to said second control valve and said second control valve selectively supplying the waste gas output of said at least one OBOGS to either the fuel tank or the cargo bay.

39. The system of claim 32, further comprising at least one heat exchanger to receive a third air stream at a first temperature to provide said third air stream at a modified temDerature as a source for said first and second air streams.

40. The system of claim 32, further comprising at least one filter/water separator to receive a third air stream and to provide filtered air with a reduced water content as a source for said first and second air streams.

41. The system of claim 32, further comprising at least one oxygen monitor.

* * * * *